No. 660,450. Patented Oct. 23, 1900.
W. B. MITCHELL.
CHURN.
(Application filed June 12, 1900.)
(No Model.)
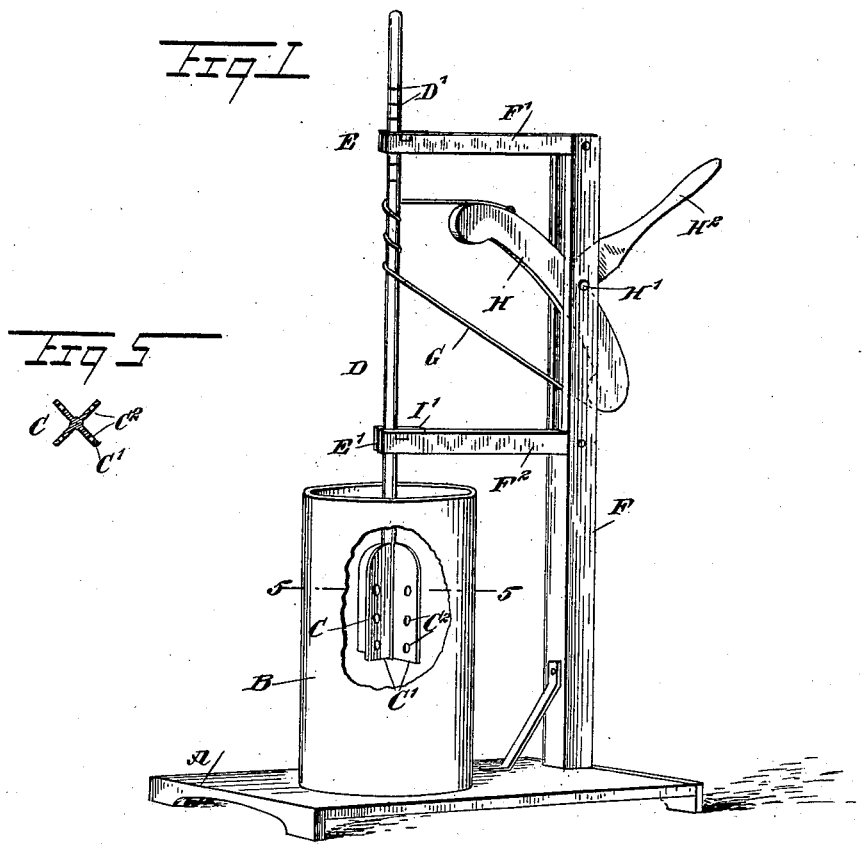
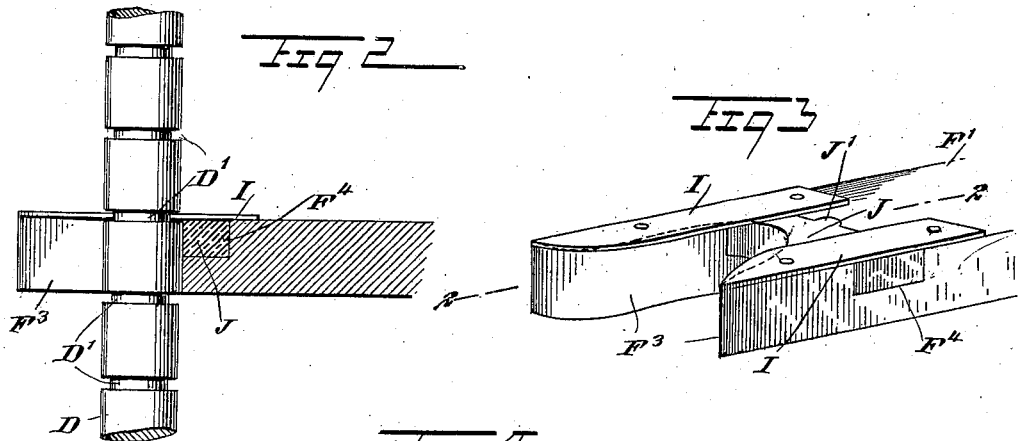
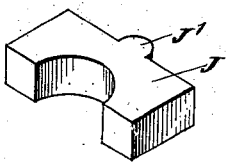
WITNESSES:
H. Walker
Geo. Hosted
INVENTOR
Wickliff B. Mitchell.
BY
ATTORNEYS

United States Patent Office.

WICKLIFF B. MITCHELL, OF OWENSBURG, INDIANA.

CHURN.

SPECIFICATION forming part of Letters Patent No. 660,450, dated October 23, 1900.

Application filed June 12, 1900. Serial No. 19,994. (No model.)

*To all whom it may concern:*

Be it known that I, WICKLIFF B. MITCHELL, a citizen of the United States, and a resident of Owensburg, in the county of Greene and State of Indiana, have invented a new and Improved Churn, of which the following is a full, clear, and exact description.

The object of the invention is to provide a new and improved churn which is simple and durable in construction, arranged to insure a quick forward and backward turning motion of the dasher with the least exertion on the part of the operator, to allow of conveniently adjusting the height of the dasher in the churn-receptacle according to the quantity of milk contained therein, to properly agitate the milk, and to cause air to be mixed with the milk and produce a rapid and thorough separation of the cream-globules from the milk.

The invention consists of novel features and parts and combinations of the same, as will be fully described hereinafter and then pointed out in the claim.

A practical embodiment of the invention is represented in the accompanying drawings, forming a part of this specification, in which similar characters of reference indicate corresponding parts in all the views.

Figure 1 is a perspective view of the improvement with parts broken out. Fig. 2 is an enlarged side elevation of the upper bearing for the dasher-rod, the section being on the line 2 2 in Fig. 3 and the dasher-rod being shown in elevation. Fig. 3 is an enlarged perspective view of the upper bearing for the dasher-rod. Fig. 4 is an enlarged perspective view of the bearing-block, and Fig. 5 is a sectional plan view of the dasher.

The improved churn is provided with a suitable platform A for supporting a churn-receptacle B, adapted to contain the milk to be churned into butter by the use of a dasher C, mounted to turn forward and backward in the receptacle and the milk contained therein. The dasher C is made cruciform in sectional plan view, the wings C' being provided with apertures $C^2$, as is plainly shown in Fig. 1.

The upwardly-extending dasher-rod D, carrying the dasher C, is mounted to turn in bearings E E', arranged on arms $F'$ $F^2$ of a standard F, erected on the platform A. On the dasher-rod D between the bearings E E' winds several times a band or rope G, secured at its ends to a lever H, fulcrumed at or near its middle at H' on the standard F, and said lever is provided with a handle $H^2$, adapted to be taken hold of by the operator to impart a swinging motion to said lever, so that the band H causes a forward and backward rotation of the dasher-rod D and the dasher C. In the upper portion of the dasher-rod D are formed a plurality of spaced angular grooves D', one of which is adapted to be engaged at a time by flanges I, secured on the forked end $F^3$ of the arm F', as is plainly shown in Figs. 2 and 3, so as to support the dasher-rod D and allow the same to turn in the bearings E E'. The back of each bearing is formed by a removable block J, set in suitable recesses $F^4$, formed on the corresponding arm F' or $F^2$, the flanges I holding the upper block J in position, and similar flanges or blades I' hold the lower block J in position on the arm $F^2$.

By the arrangement described the dasher-rod D can be readily pulled in a forward direction out of the open forward ends of the bearings E E' to permit of adjusting the dasher-rod D vertically, so as to bring the dasher C the desired height in the receptacle B, according to the amount of milk contained in said receptacle. When this has been done, the dasher-rod D is replaced in the bearings E E', the corresponding annular groove D' engaging the flanges I, so that the latter support the dasher-rod D in the adjusted position. When the operator imparts a swinging motion to the handle $H^2$, the band G readily turns the dasher-rod D and dasher C to churn the milk and form the butter. By having the dasher C constructed in the manner described it is evident that when the dasher turns in one direction the milk contained in the receptacle is moved in an upward direction, and when the dasher turns in the opposite direction the milk is forced downward, so that air is drawn in and mixed with the milk to insure a quick and thorough separation of the cream-globules from the milk.

The bearing-blocks J are preferably made of glass, and hence are not liable to wear out during the lifetime of the churn. As the glass bearing-blocks J are very smooth it is evident that the dasher-rod D turns properly in the bearings E E' and without undue friction, it being understood that the pull of the band G on the said dasher-rod is against the said bearing-block in both bearings E E', and consequently the bearing-block is subjected to the most pressure.

Having thus fully described my invention, I claim as new, and desire to secure by Letters Patent—

In a churn, a frame comprising a standard, arms extended outward from the standard and having forked ends forming bearings for the dasher-rod, a dasher-rod having a series of annular channels formed in it, and flanges on the forked members of one of the arms for engaging in either one of said channels to support the rod as adjusted vertically, substantially as specified.

In testimony whereof I have signed my name to this specification in the presence of two subscribing witnesses.

WICKLIFF B. MITCHELL.

Witnesses:
 HORACE FERGUSON,
 GEO. B. M. REESE.